(12) United States Patent
Hashimoto

(10) Patent No.: US 8,334,861 B2
(45) Date of Patent: Dec. 18, 2012

(54) DISPLAY DEVICE WITH UV DETECTING FUNCTION AND ELECTRONIC APPARATUS EQUIPPED WITH THE SAME

(75) Inventor: Kazuyuki Hashimoto, Hyogo (JP)

(73) Assignee: TPO Displays Corp., Miao-Li County (TW)

( * ) Notice: Subject to any disclaimer, the term of this patent is extended or adjusted under 35 U.S.C. 154(b) by 248 days.

(21) Appl. No.: 12/725,704

(22) Filed: Mar. 17, 2010

(65) Prior Publication Data

US 2010/0253661 A1    Oct. 7, 2010

(30) Foreign Application Priority Data

Apr. 2, 2009    (JP) .................................. 2009-90090

(51) Int. Cl.
G06F 3/038    (2006.01)
(52) U.S. Cl. ....................................................... 345/207
(58) Field of Classification Search .................... 345/87, 345/102, 205, 207; 250/200, 205, 206, 208.2
See application file for complete search history.

(56) References Cited

U.S. PATENT DOCUMENTS

| | | | |
|---|---|---|---|
| 7,777,736 B2 * | 8/2010 | Fujita et al. ................... | 345/207 |
| 2005/0201036 A1 | 9/2005 | Santero et al. | |
| 2005/0269487 A1 * | 12/2005 | Ozawa ....................... | 250/214 R |
| 2007/0070264 A1 | 3/2007 | Fujita et al. | |
| 2007/0153157 A1 * | 7/2007 | Kang et al. ....................... | 349/61 |
| 2007/0268241 A1 * | 11/2007 | Nitta et al. ..................... | 345/102 |
| 2008/0001070 A1 * | 1/2008 | Nakamura et al. ......... | 250/214 R |
| 2008/0073490 A1 * | 3/2008 | Koide ........................ | 250/214 C |
| 2009/0321640 A1 | 12/2009 | Onogi | |

FOREIGN PATENT DOCUMENTS

| | | |
|---|---|---|
| JP | 2000-066623 A | 3/2000 |
| JP | 2000111674 A | 4/2000 |
| JP | 2004-061417 A | 2/2004 |
| JP | 2004045921 A | 2/2004 |
| JP | 2005-69843 | 3/2005 |
| JP | 2005260247 | 9/2005 |
| JP | 2007-093849 A | 4/2007 |
| JP | 2007-114315 A | 5/2007 |
| JP | 2008-224896 A | 9/2008 |
| JP | 2010-008276 A | 1/2010 |

* cited by examiner

Primary Examiner — Chanh Nguyen
Assistant Examiner — Pegeman Karimi
(74) Attorney, Agent, or Firm — Kirton McConkie; Evan R. Witt

(57) ABSTRACT

A display device includes a display panel. The display panel has a visible-light transmissible polarizer at a side of receiving an external light, and includes a first optical sensor, a second optical sensor and a sensor output computing part. The first optical sensor is disposed on a substrate of the display panel and unsheltered by the polarizer for detecting the external light. The first optical sensor outputs a first signal in response to a detected wavelength component of the external light. The second optical sensor is disposed on the substrate of the display panel and sheltered by the polarizer for detecting a visible light passing through the polarizer. The second optical sensor outputs a second signal in response to a detected wavelength component of the visible light. According to the first signal and the second signal, the sensor output computing part computes a UV light intensity of the external light.

7 Claims, 8 Drawing Sheets

DISPLAY DEVICE WITH UV DETECTING FUNCTION AND ELECTRONIC APPARATUS EQUIPPED WITH THE SAME

FIELD OF THE INVENTION

The present invention relates to a display device having a display panel for displaying images, in which the display panel has a visible-light transmissible polarizer at a side of receiving an external light. The present invention also relates to an electronic apparatus equipped with such a display device.

BACKGROUND OF THE INVENTION

Recently, some electronic apparatuses (e.g. watches, mobile phones, and the like) are designed to have an ultraviolet (UV) detecting function. Conventionally, the UV detecting function is implemented by equipping an electronic apparatus with a commercially available UV sensor, which is produced according to a gallium nitride (GaN) fabricating process (as is disclosed in Japanese Patent Application No. JP-A-2005-69843 for example).

However, after the additional UV sensor is assembled into the electronic apparatus, the fabricating cost of the electronic apparatus will rise because of the UV sensor. In addition, since the electronic apparatus is designed to retain a space for assembling the UV sensor, the layout space of the electronic apparatus is stringently restricted. Therefore, it is necessary to obviate the above drawbacks.

SUMMARY OF THE INVENTION

An object of the present invention provides a display device with a UV detecting function while having reduced fabricating cost and saved layout space.

Another object of the present invention provides an electronic apparatus equipped with such a display device.

For achieving the above objects, the present invention provides a display device. The display device includes a display panel for displaying images. The display panel has a polarizer at a side of receiving an external light. The polarizer is visible-light transmissible. The display panel includes at least one first optical sensor, at least one second optical sensor and a sensor output computing part. The first optical sensor is disposed on a substrate of the display panel and unsheltered by the polarizer. The external light is detectable by the first optical sensor. The first optical sensor outputs a first signal in response to a detected wavelength component of the external light. The second optical sensor is disposed on the substrate of the display panel and sheltered by the polarizer. A visible light passing through the polarizer is detectable by the second optical sensor. The second optical sensor outputs a second signal in response to a detected wavelength component of the visible light. According to the first signal and the second signal respectively outputted from the first optical sensor and the second optical sensor, the sensor output computing part computes a UV light intensity of the external light.

The process of assembling the UV detecting module is no longer complicated, and the UV detecting module can be installed on the display panel in a simplified manner. Therefore, the display device and the electronic apparatus equipped with the display device are capable of detecting the UV light intensity while having reduced fabricating cost and saved layout space.

In an embodiment, a computing signal is obtained by subtracting the product of the second signal and a reciprocal of a visible light transmittance of the polarizer from the first signal, and the UV light intensity of the external light is computed by the sensor output computing part according to the computing signal.

In an embodiment, the display device further includes at least one third optical sensor, which is disposed on the substrate of the display panel and arranged at a position where the external light is hindered. If the display device has a backlight source, a backlight emitted from the backlight source is detectable by the third optical sensor. The influence of the backlight and/or a temperature on the signals outputted from the first optical sensor and the second optical sensor is compensated by the sensor output computing part according to a third signal outputted from the third optical sensor.

In an embodiment, the display device further includes a signal converting part, which is arranged in upstream of the sensor output computing part. An analog signal to be inputted into the sensor output computing part is firstly converted into a digital signal by the signal converting part, and the digital signal is then delivered to the sensor output computing part. Alternatively, in a case that the sensor output computing part can process an analog signal, the display device further includes a signal converting part. The analog signal indicating the UV light intensity and outputted from the sensor output computing part is converted into a digital signal by the signal converting part.

In an embodiment, the optical sensors are LTPS lateral PIN photodiodes or amorphous silicon diodes.

In an embodiment, the display panel is a LCD panel or an OLED display panel.

In an embodiment, the display device can be installed on an electronic apparatus such as a mobile phone, a watch, a personal digital assistant (PDA), a laptop computer, a navigation apparatus, a handheld game console, an outdoor-type large screen (e.g. Aurora Vision), or the like.

The display device of the present invention is capable of detecting the UV light intensity and has reduced fabricating cost and saved layout space.

BRIEF DESCRIPTION OF THE DRAWINGS

The above objects and advantages of the present invention will become more readily apparent to those ordinarily skilled in the art after reviewing the following detailed description and the accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
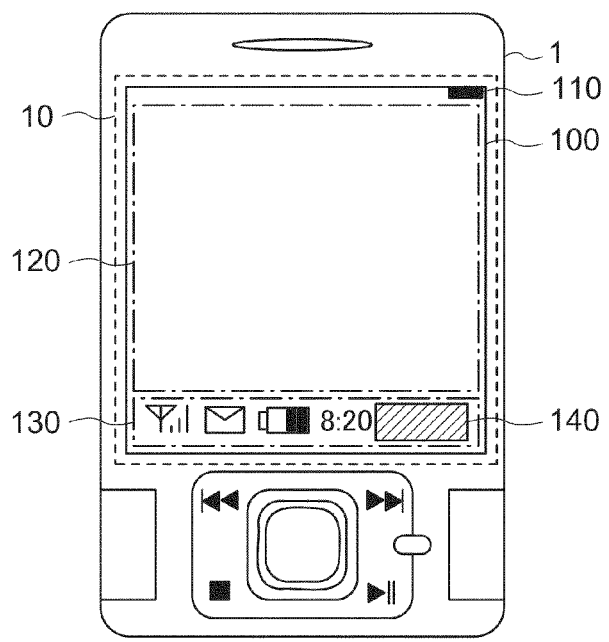
FIG. 1 is a schematic diagram illustrating an electronic apparatus with a display device according to an embodiment of the present invention.

FIG. 1 is a schematic diagram illustrating an electronic apparatus with a display device according to an embodiment of the present invention. In FIG. 1, the electronic apparatus 1 is illustrated by referring to a mobile phone. Nevertheless, the electronic apparatus 1 may be a watch, a personal digital assistant (PDA), a laptop computer, a navigation apparatus, a handheld game console, an outdoor-type large screen (e.g. Aurora Vision), or the like.

The electronic apparatus 1 comprises a display device 10. The display device 10 has a display panel 100 for displaying images. In addition, the display device 10 has a UV detecting module 110 for detecting the UV light with a wavelength shorter than 400 nm (e.g. in the UV-A and UV-B bands). The display panel 100 has an image displaying zone 120 and an information displaying zone 130. The images associated with the operations of the electronic apparatus 1 could be displayed on the image displaying zone 120. Some information associated with the electronic apparatus 1 could be displayed on the information displaying zone 130. The information to be displayed on the information displaying zone 130 includes for example a mobile phone reception status, an e-mail reception status, battery's residual capacity estimation, current time, and the like. The display panel 100 further includes a non-displaying zone around the image displaying zone 120 and the information displaying zone 130. In this embodiment, the UV detecting module 110 is installed in any position of the non-displaying zone of the display panel 100.

Figure 2A:
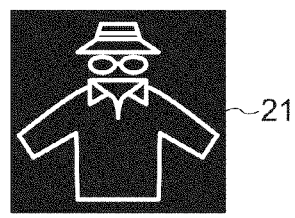
FIGS. 2A and 2B are schematic diagrams illustrating two exemplary UV detection results acquired by the electronic apparatus.
Figure 2B:
Figure 3:
FIG. 3 is a schematic diagram illustrating another exemplary UV detection result acquired by the electronic apparatus.

The UV detection result acquired by the UV detecting module 110 is shown on a UV detection indicating region 140, which is located at any position of the information displaying zone 130. FIGS. 2A, 2B and 3 illustrate some exemplary UV detection results shown on the UV detection indicating region 140.

In FIGS. 2A and 2B, the UV detection results are indicated by the graphic presentations 21 and 22, respectively. For example, in a case that the UV light intensity is weak and no special UV protective measure needs to be adopted, no icon is shown on the UV detection indicating region 140. Whereas, in a case that the UV light intensity is strong and the UV protective measure needs to be adopted, the graphic presentation 21 or 22 is shown on the UV detection indicating region 140 according to the UV light intensity. In this embodiment, the UV light intensity indicated by the graphic presentation 22 is higher than that indicated by the graphic presentation 21. Once the graphic presentation 22 is shown on the UV detection indicating region 140, the user will realize that a specified UV protective measure should be adopted. The graphic presentations 21 and 22 used in this context are described in Global Solar UV Index: A Practical Guide published by World Health Organization (see http://www.who.int/uv/publications/en/GlobalUVI.pdf).

In FIG. 3, the UV detection result is indicated by a color indication pattern 23. The higher the UV light intensity is, the deeper the color shown on the color indication pattern 23 becomes. Alternatively, as the UV light intensity is increased, the color indication pattern 23 is switched from a cold color to a warm color.

Moreover, the UV detection result may be indicated as any comprehensible text (e.g. "UV: 1/15"). The term "UV: 1/15" means that there are 15 UV radiation levels and the denominator is 15, Depending on the UV light intensity, the number of the numerator is increased or decreased.

Hereinafter, some examples of implementing the UV detection according to the present invention will be illustrated in more details.

EXAMPLE 1

Figure 4:
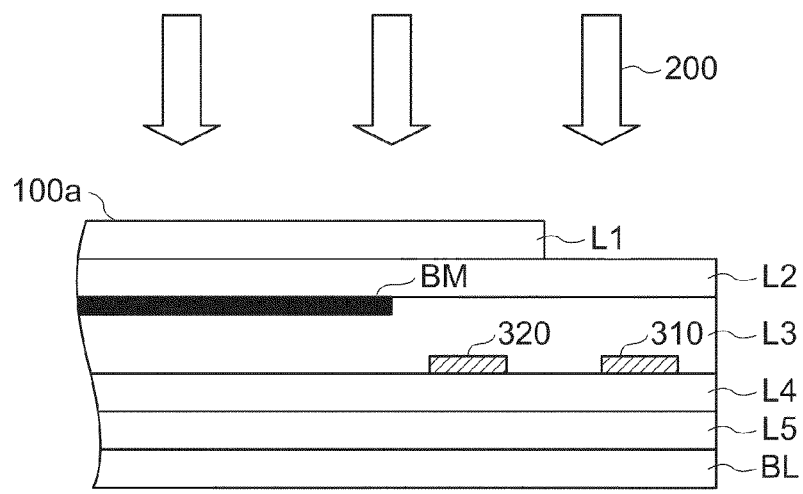
FIG. 4 is a cross-sectional view illustrating a display panel according to Example 1 of the present invention.

Please refer to FIG. 4, which is a cross-sectional view illustrating a display panel of Example 1.

The display panel 100a shown in FIG. 4 is a transmissive LCD panel or a transflective LCD panel. From top to bottom of the laminate, the display panel 100a comprises a first polarizer L1, a first glass substrate L2, a liquid crystal layer L3, a second glass substrate L4, a second polarizer L5 and a backlight source BL. In addition, a black matrix BM is formed on the interface between the first glass substrate L2 and the liquid crystal layer L3 of the display panel 100a.

The display panel 100a further comprises a first optical sensor 310 and a second optical sensor 320. The first optical sensor 310 and the second optical sensor 320 constitute an UV detecting module 110a, which will be illustrated later in FIG. 6. The first optical sensor 310 and the second optical sensor 320 are disposed on the second glass substrate L4 of the display panel 100a. It is preferred that the first optical sensor 310 and the second optical sensor 320 have identical properties and structures. In this embodiment, the first optical sensor 310 and the second optical sensor 320 are semiconducting components such as three-terminal low-temperature polysilicon (LTPS) lateral PIN photodiodes (also referred hereinafter as LTPS photodiodes) or two-terminal amorphous silicon diodes.

Figure 5A:
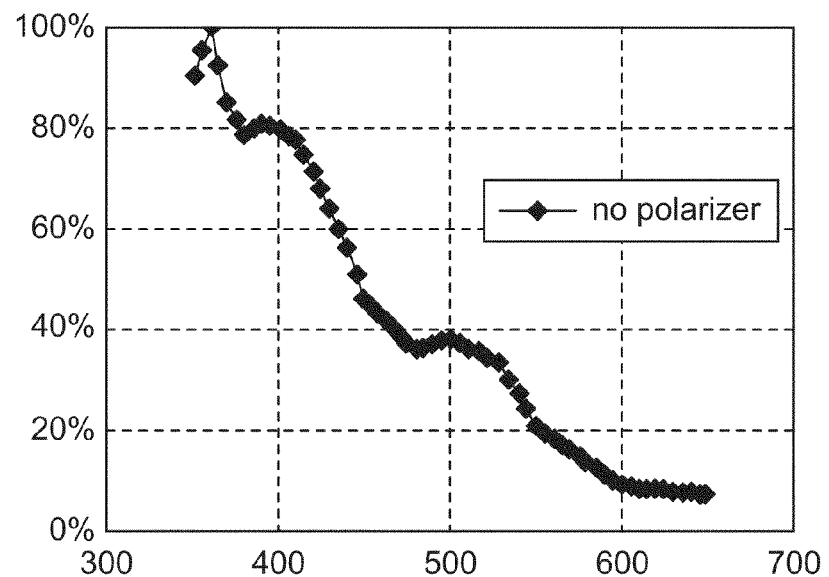
FIG. 5A is a plot illustrating the wavelength response characteristic of the first optical sensor.

The first optical sensor 310 is disposed on a region of the second glass substrate L4 that is unsheltered by the first polarizer L1. The external light 200 passing through the first glass substrate L2 is detectable by the first optical sensor 310. According to the wavelength component of the external light 200, the first optical sensor 310 generates a corresponding signal. For example, the wavelength response characteristic of the first optical sensor 310 is shown in FIG. 5A. In FIG. 5A, the horizontal axle indicates the wavelength of the external light (nm), and the vertical axle indicates corresponding wavelength response percentage (%). As shown in FIG. 5A, the first optical sensor 310 is sensitive to the visible light having a wavelength longer than 400 nm and the UV light having a wavelength shorter than 400 nm. In other words, the first optical sensor 310 may generate photocurrent that is excited by the visible light or the UV light.

Figure 5B:
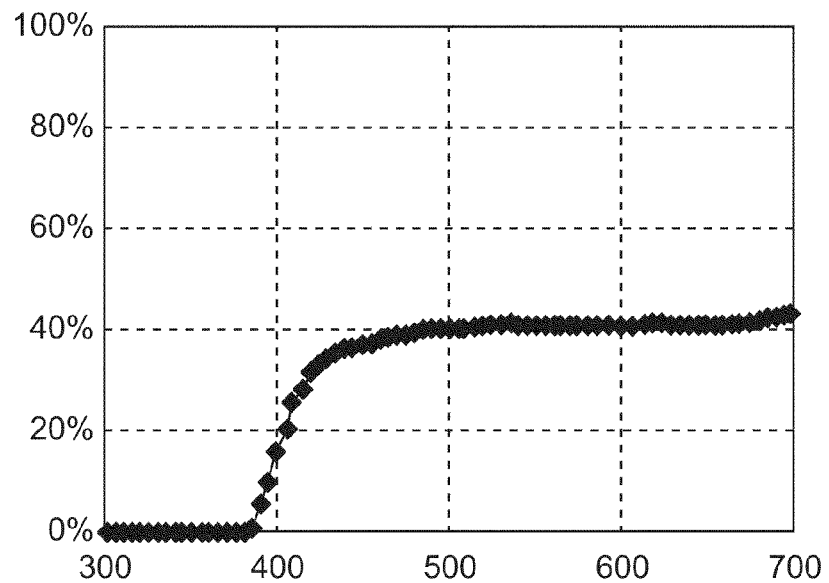
FIG. 5B is a plot illustrating a transmittance spectrum for the polarizer.
Figure 5C:
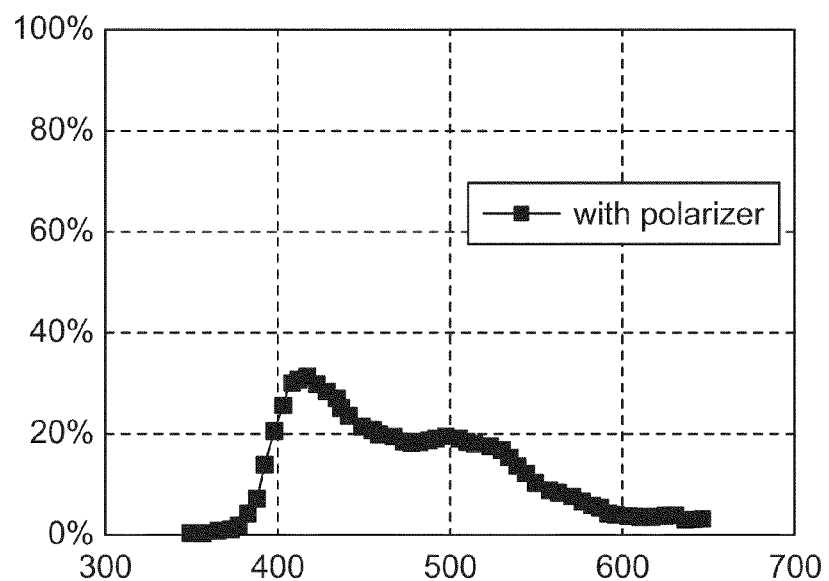
FIG. 5C is a plot illustrating the wavelength response characteristic of the second optical sensor.

The second optical sensor 320 is disposed on a region of the second glass substrate L4 that is sheltered by the first polarizer L1. The external light 200 passing through both of the first polarizer L1 and the first glass substrate L2 is detectable by the second optical sensor 320. According to the wavelength component of the visible light, the second optical sensor 320 generates a corresponding signal. Since the first polarizer L1 and second polarizer L5 are only visible-light transmissible, the UV light component is obstructed from passing through the first polarizer L1. For example, a transmittance spectrum for the first polarizer L1 or second polarizer L5 will be illustrated with reference to FIG. 5B. In FIG. 5B, the horizontal axle indicates the wavelength of the external light (nm), and the vertical axle indicates corresponding transmittance (%). In addition, the wavelength response characteristic of the second optical sensor 320 is shown in FIG. 5C. In FIG. 5C, the horizontal axle indicates the wavelength of the external light (nm), and the vertical axle indicates corresponding wavelength response percentage (%). As shown in FIG. 5C, the second optical sensor 320 is only sensitive to the visible light having a wavelength longer than 400 nm. In other words, the second optical sensor 320 may generates photocurrent that is excited by the visible light. Moreover, since the visible light transmittance of the first polarizer L1 (see FIG. 5B) is lower than 100%, the visible light intensity detected by the second optical sensor 320 is lower than the visible light intensity of the external light 200.

Figure 5D:
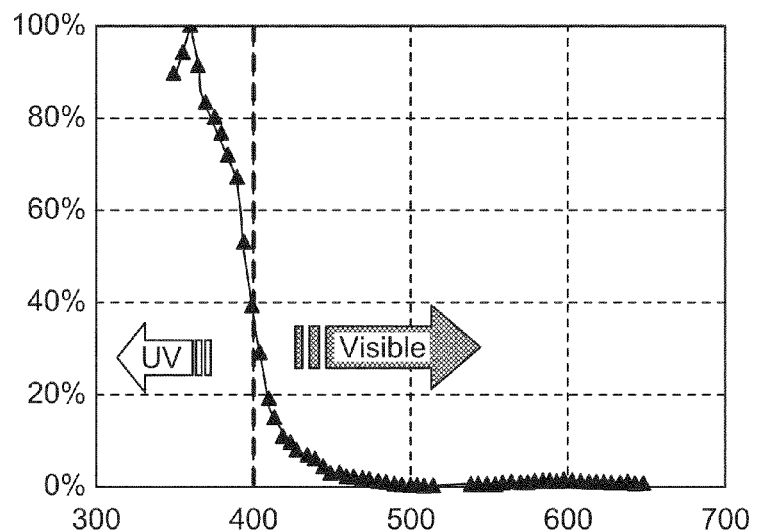
FIG. 5D is a plot illustrating wavelength component acquired by the UV detecting module in Example 1.

The wavelength component detected by the second optical sensor 320 and the reciprocal of the visible light transmittance of the first polarizer L1 are firstly multiplied together to obtain a product. After the product is subtracted from the wavelength component that is detected by the first optical sensor 310, the UV detecting module 110a can compute the UV light intensity of the external light 200. The wavelength component acquired by the UV detecting module 110a is shown in FIG. 5D. In FIG. 5D, the horizontal axle indicates the wavelength of the external light (nm), and the vertical axle indicates corresponding wavelength response percentage (%). As can be seen from FIG. 5D, the UV detecting module 110a is almost capable of acquiring the UV light having a wavelength shorter than 400 nm by itself.

Figure 6:
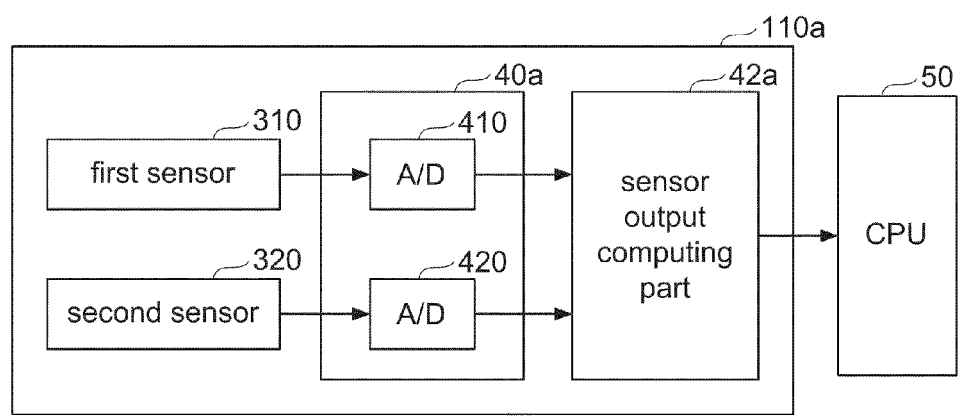
FIG. 6 is a schematic functional block diagram illustrating the UV detecting module in Example 1.

Hereinafter, the functions of the UV detecting module 110a using the first optical sensor 310 and the second optical sensor 320 will be illustrated with reference to FIG. 6. FIG. 6 is a schematic functional block diagram illustrating the UV detecting module 110a in Example 1.

As shown in FIG. 6, the UV detecting module 110a comprises a first optical sensor 310, a second optical sensor 320, a signal converting part 40a and a sensor output computing part 42a. As described in FIGS. 5A~5C, the first optical sensor 310 can detect the visible light component and the UV light component included in the external light 200; and the second optical sensor 320 can detect only the visible light component included in the external light 200 while excluding the UV light component. By the signal converting part 40a, the photocurrent-form signals outputted from respective optical sensors are converted into digital or pulse signals that can be processed by the sensor output computing part 42a. In this embodiment, the signal converting part 40a comprises a first analog-to-digital (A/D) converter 410 and a second analog-to-digital (A/D) converter 420, which are respectively connected to the first optical sensor 310 and the second optical sensor 320. The signals outputted from the first optical sensor 310 and the second optical sensor 320 are converted into digital signals by the first analog-to-digital (A/D) converter 410 and the second analog-to-digital (A/D) converter 420, respectively. According to the digital signals, the sensor output computing part 42a can acquire the UV light intensity of the external light 200. The UV light intensity acquired by the sensor output computing part 42a is then inputted into a controller 50 (e.g. CPU), which is used for controlling the operations of the display device 10. The CPU 50 may display the UV light intensity on the display panel 100 of FIG. 1 by means of the graphic presentation 21 or 22 (see FIGS. 2A and 2B) or the color indication pattern 23 (see FIG. 3). Moreover, for further utilizing the UV light intensity, the information associated with the UV light intensity acquired by the sensor output computing part 42a may be stored in a memory part such as a random access memory (RAM) or a flash memory (not shown).

Figure 7:
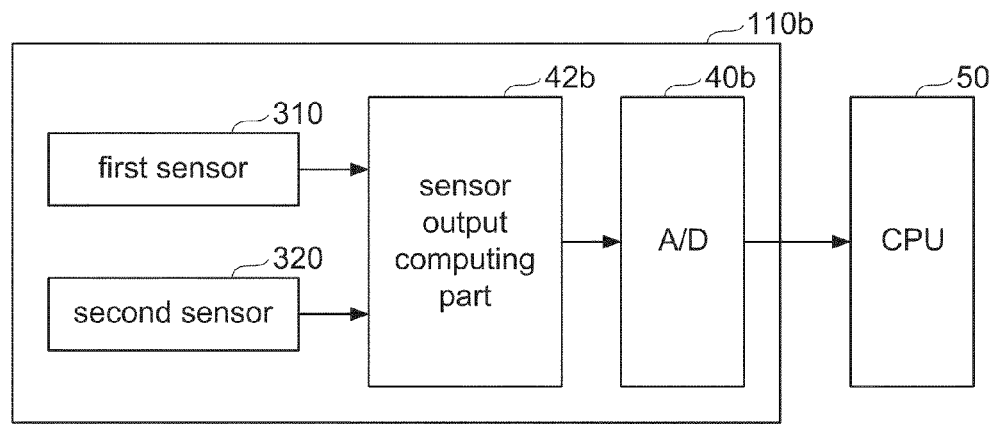
FIG. 7 is a schematic functional block diagram illustrating another exemplary UV detecting module in Example 1.

In addition to the UV detecting module 110a, the present invention also provides another exemplary UV detecting module 110b to detect the UV light intensity (see FIG. 7). FIG. 7 is a schematic functional block diagram illustrating another exemplary UV detecting module in Example 1.

As shown in FIG. 7, the UV detecting module 110b comprises a first optical sensor 310, a second optical sensor 320, a sensor output computing part 42b and a signal converting part 40b. In the UV detecting module 110b, the UV light intensity is directly acquired by the sensor output computing part 42b according to the photocurrent-form signals outputted from the first optical sensor 310 and the second optical sensor 320. By the signal converting part 40b, the acquired UV light intensity is converted into digital or pulse signals. In other words, the operations of the UV detecting module 110b are distinguished from the UV detecting module 110a of FIG. 6 in this aspect.

The configurations of the sensor output computing part of the UV detecting module in Example 1 (see FIGS. 6 and 7) will be illustrated with reference to FIG. 8.

Figure 8:
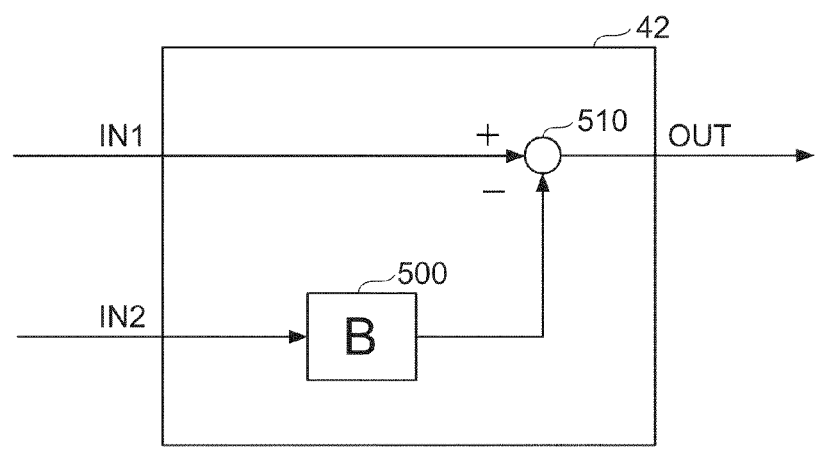
FIG. 8 is a schematic diagram illustrating the configurations of the sensor output computing part of the UV detecting module in Example 1.

As shown in FIG. 8, the sensor output computing part 42 comprises a multiplier 500 and a subtracter 510. The analog or digital signal outputted from the second optical sensor 320 is inputted into the multiplier 500 through a second input end IN2, so that the analog or digital signal outputted from the second optical sensor 320 is multiplied by a correction coefficient B. The analog or digital signal outputted from the first optical sensor 310 is inputted into the subtracter 510 through a first input end IN1, so that the signal outputted from the second optical sensor 320 and corrected by the multiplier 500 will be subtracted from the signal outputted from the first optical sensor 310. As a consequence, the output end OUT of the sensor output computing part 42 will output a corresponding wavelength component as shown in FIG. 5D.

In an embodiment, the computing operation is performed by the sensor output computing part 42 according to the following equation:

$$Ia(\text{Vis},\text{UV}) - B \times Ib(\text{Vis}) = Ia(\text{UV}) + Ia(\text{Vis}) - B \times Ib(\text{Vis})$$
$$= Ia(\text{UV})$$

In this equation, Ia(Vis,UV) indicates the photocurrent that is excited by the external light (visible light +UV light) and generated by the first optical sensor 310, and Ib(Vis) indicates the photocurrent that is excited by the visible light and generated by the second optical sensor 320. Moreover, Vis indicates the visible light intensity, and UV indicates the UV light intensity. Here, the correction coefficient B is the reciprocal of the visible light transmittance of the first polarizer L1 of the display panel 100a. The transmittance (1/B) is equal to a ratio of the visible light intensity detected by the first optical sensor 310 to the visible light intensity detected by the second optical sensor 320 (i.e. Ib(Vis)/Ia(Vis)). In other words, Ia(Vis)−B× Ib(Vis)=0.

From the description in Example 1, the process of assembling the UV detecting module is no longer complicated. That is, the UV detecting module can be installed on the display panel in a simplified manner. Therefore, the display device and the electronic apparatus equipped with the display device are capable of detecting the UV light intensity while having reduced fabricating cost and saved layout space.

EXAMPLE 2

However, in the display panel 100a having the backlight source BL as shown in FIG. 4, both of the first optical sensor 310 and the second optical sensor 320 are influenced by the backlight source BL. Recently, organic light emitting diode (OLED) display panels using organic light-emitting diodes have become potential candidates to replace LCD panels. Although no backlight source BL is included in the OLED display panel, the first optical sensor 310 and the second optical sensor 320 are possibly affected by any external factor irrelevant to the light intensity (e.g. temperature) and thus generate dark current. Due to the influence of backlight and/or dark current, the detecting accuracy of detecting the UV light intensity is unsatisfactory in some circumstances.

Figure 9:
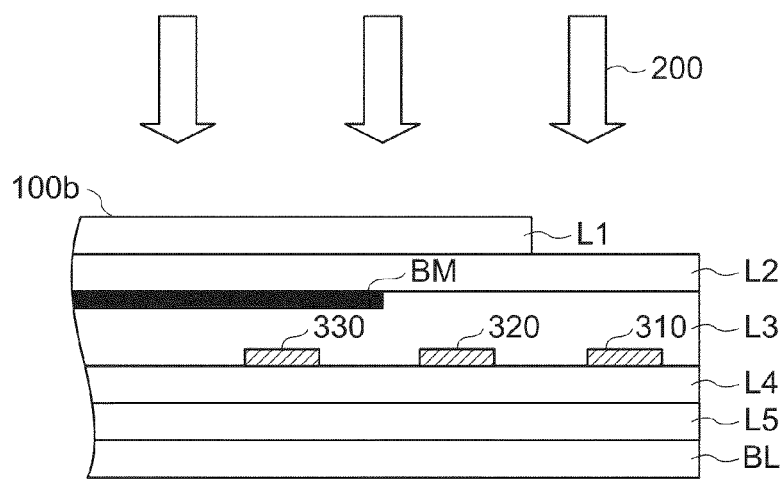
FIG. 9 is a cross-sectional view illustrating a display panel according to Example 2 of the present invention.

FIG. 9 is a cross-sectional view illustrating a display panel according to Example 2 of the present invention. The display panel of Example 2 has an UV detecting module with the function of compensating backlight and/or dark current.

The configurations of the display panel 100b of FIG. 9 are substantially identical to those of the display panel 100a of FIG. 4, except that the display panel 100b further comprises a third optical sensor 330 on the second substrate L4 in addition to the first optical sensor 310 and the second optical sensor 320. It is preferred that the first optical sensor 310, the second optical sensor 320 and the third optical sensor 330 have identical properties and structures. For example, the optical sensors 310, 320 and 330 are semiconducting components such as LTPS photodiodes or amorphous silicon diodes.

In particular, the third optical sensor 330 is disposed on the second substrate L4 and sheltered by the black matrix BM. The backlight emitted from the backlight source BL is detectable by the third optical sensor 330. According to the detected backlight, the third optical sensor 330 generates a corresponding signal. In addition, since the external light 200 is completely hindered by the black matrix BM, the external light 200 fails to be detected by the third optical sensor 330.

Figure 10A:
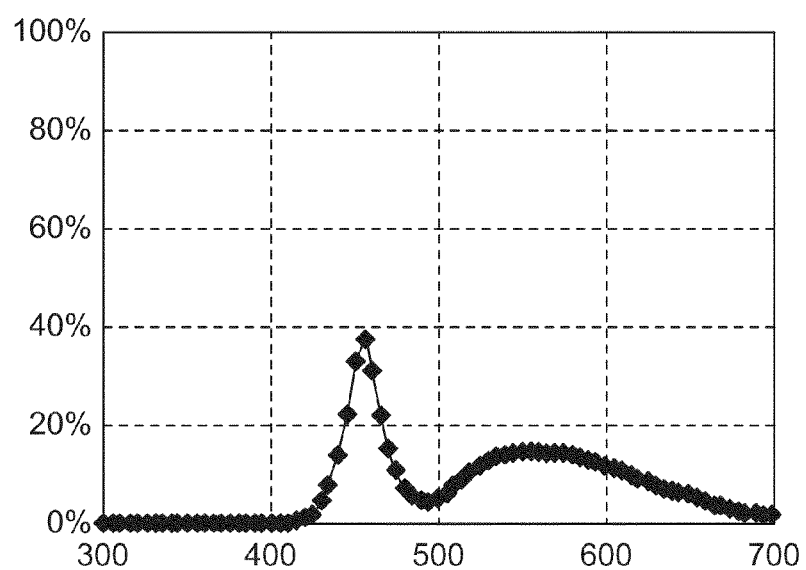
FIG. 10A is a plot illustrating a wavelength spectrum of the backlight emitted by the backlight source and passing through the polarizer.
Figure 10B:
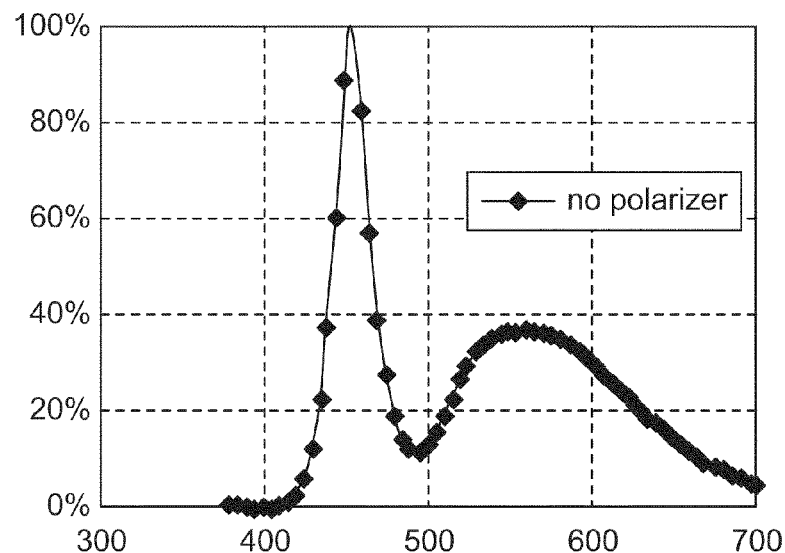
FIG. 10B is a plot illustrating a wavelength spectrum of the backlight emitted by the backlight source.

After the backlight emitted from the backlight source BL passes through a polarizer, a wavelength spectrum is shown in FIG. 10A. On the other hand, the backlight emitted from the backlight source BL has a wavelength spectrum as shown in FIG. 10B. The backlight emitted from the backlight source BL passes through the second polarizer L5 and is detected by the third optical sensor 330. As shown in FIG. 10A, the third optical sensor 330 is not sensitive to the UV light having a wavelength shorter than 400 nm. Moreover, since the visible light transmittance of the second polarizer L5 is lower than 100%, the visible light intensity detected by the third optical sensor 330 is lower than the visible light intensity of the backlight.

Moreover, the third optical sensor 330 can detect the dark current, which is resulted from any external factor irrelevant to the light intensity (e.g. temperature) and flows through the first optical sensor 310 and the second optical sensor 320. Ideally, since the first optical sensor 310, the second optical sensor 320 and the third optical sensor 330 have identical properties and structures, the magnitudes of the dark current are considered to be identical in some circumstances. For example, in a case that the UV detecting module has no backlight source BL or the backlight source BL is turned off, no photocurrent is generated by the third optical sensor 330 because the external light 200 is sheltered by the black matrix BM. In this situation, the current flowing through the third optical sensor 330 can be considered as the dark current resulted from the first optical sensor 310 and the second optical sensor 320.

Figure 11:
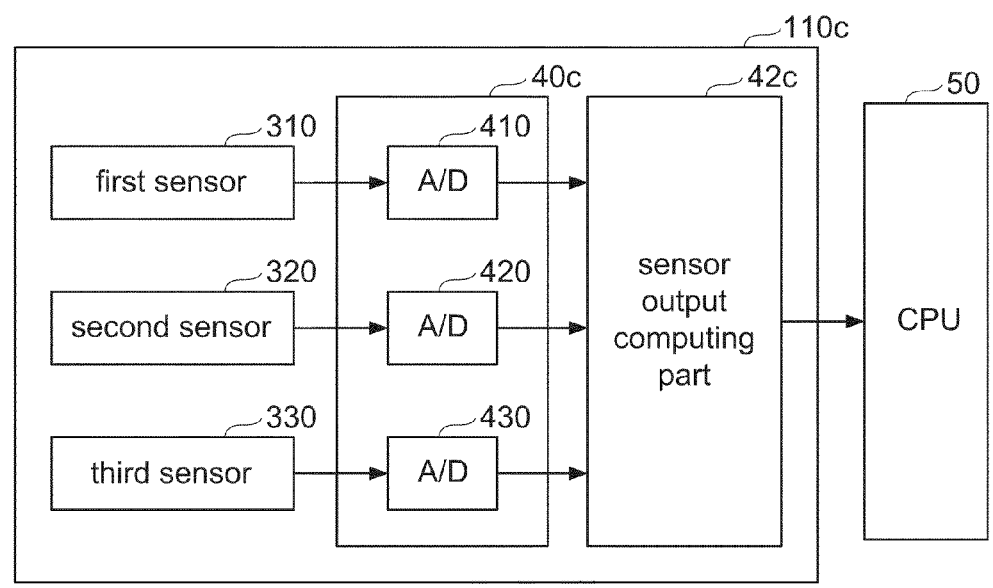
FIG. 11 is a schematic functional block diagram illustrating the UV detecting module in Example 2.

Hereinafter, the functions of the UV detecting module 110c using the first optical sensor 310, the second optical sensor 320 and the third optical sensor 330 will be illustrated with reference to FIG. 11. FIG. 11 is a schematic functional block diagram illustrating the UV detecting module 110c in Example 2.

As shown in FIG. 11, the UV detecting module 110c comprises a first optical sensor 310, a second optical sensor 320, a third optical sensor 330, a signal converting part 40c and a sensor output computing part 42c. As described in FIGS. 5A~5C, the first optical sensor 310 can detect the visible light component and the UV light component included in the external light 200; and the second optical sensor 320 can detect only the visible light component of the external light 200 excluding the UV light component. In addition, as described in FIGS. 10A and 10B, the third optical sensor 330 can detect the backlight which is emitted from the backlight source BL and directed to the third optical sensor 330 through the second polarizer L5, and/or detect the dark current which is resulted from external factor (e.g. temperature). By the signal converting part 40c, the photocurrent-form signals outputted from respective optical sensors are converted into digital or pulse signals that can be processed by the sensor output computing part 42c. In this embodiment, the signal converting part 40c comprises a first analog-to-digital (A/D) converter 410, a second analog-to-digital (A/D) converter 420 and a third analog-to-digital (A/D) converter 430, which are respectively connected to the first optical sensor 310, the second optical sensor 320 and the third optical sensor 330. The signals outputted from the first optical sensor 310, the second optical sensor 320 and the third optical sensor 330 are converted into digital signals by the first analog-to-digital (AID) converter 410, the second analog-to-digital (A/D) converter 420 and the third analog-to-digital (A/D) converter 430, respectively. According to the digital signals, the sensor output computing part 42c can acquire the UV light intensity of the external light 200. The UV light intensity acquired by the sensor output computing part 42c is then inputted into a controller 50 (e.g. CPU), which is used for controlling the operations of the display device 10. The CPU 50 may display the UV light intensity on the display panel 100 of FIG. 1 by means of the graphic presentation 21 or 22 (see FIGS. 2A and 2B) or the color indication pattern 23 (see FIG. 3). Moreover, for further utilizing the UV light intensity, the information associated with the UV light intensity acquired by the sensor output computing part 42c may be stored in a memory part such as a random access memory (RAM) or a flash memory (not shown).

Figure 12:
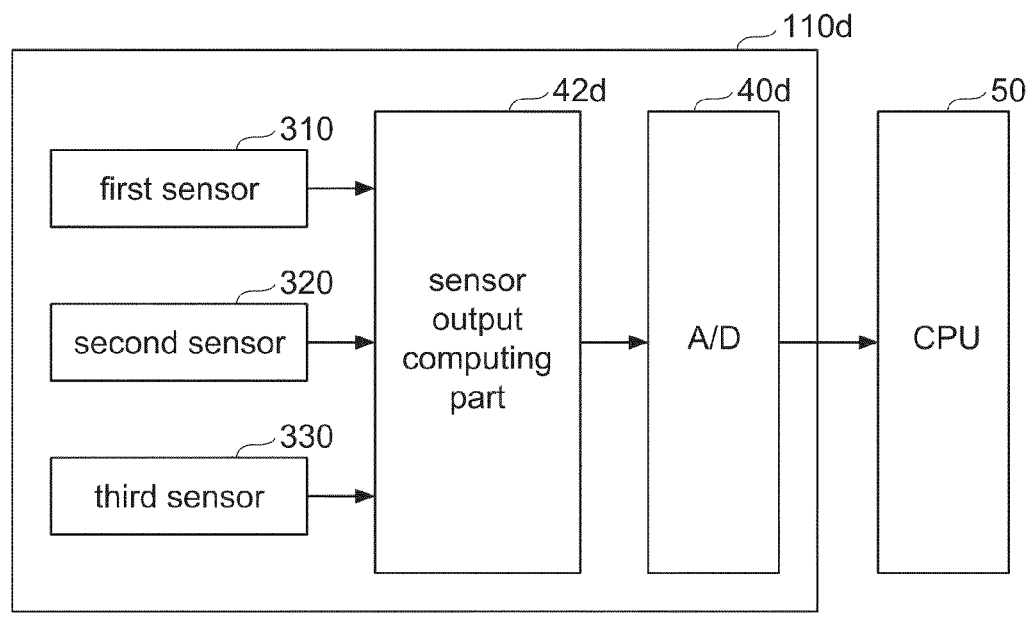
FIG. 12 is a schematic functional block diagram illustrating another exemplary UV detecting module in Example 2.

In addition to the UV detecting module 110c, the present invention also provides another exemplary UV detecting module 110d to detect the UV light intensity (see FIG. 12). FIG. 12 is a schematic functional block diagram illustrating another exemplary UV detecting module in Example 2.

As shown in FIG. 12, the UV detecting module 110d comprises a first optical sensor 310, a second optical sensor 320, a third optical sensor 330, a sensor output computing part 42d and a signal converting part 40d. In the UV detecting module 110d, the UV light intensity is directly acquired by the sensor output computing part 42d according to the photocurrent-form signals outputted from the first optical sensor 310, the second optical sensor 320 and the third optical sensor 330. By the signal converting part 40d, the acquired UV light intensity is converted into digital or pulse signals. In other words, the operations of the UV detecting module 110d are distinguished from the UV detecting module 110c of FIG. 11 in this aspect.

The configurations of the sensor output computing part of the UV detecting module in Example 2 (see FIGS. 11 and 12) will be illustrated with reference to FIG. 13.

Figure 13:
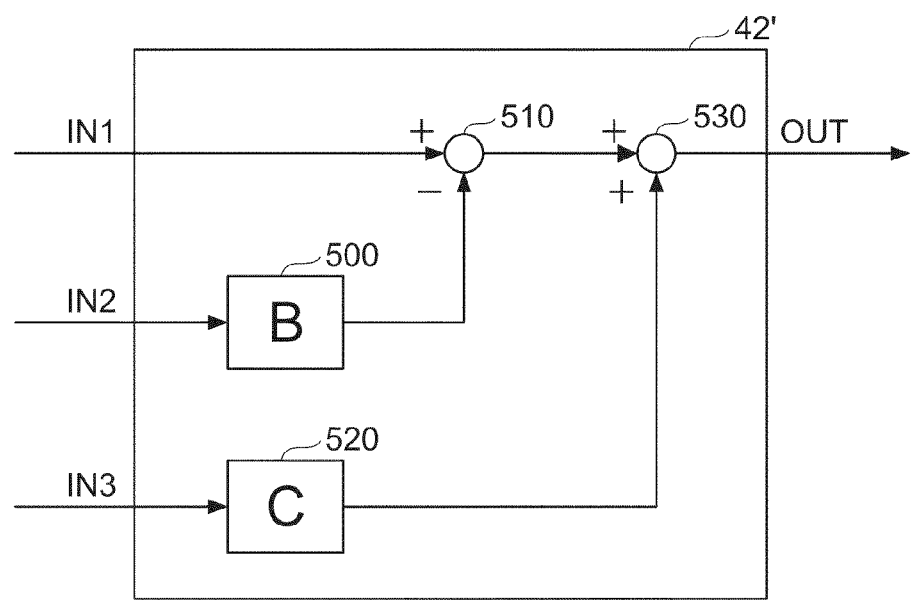
FIG. 13 is a schematic diagram illustrating the configurations of the sensor output computing part of the UV detecting module in Example 2.

As shown in FIG. 13, the sensor output computing part 42' further comprises a multiplier 520 and an adder 530 in addition to the multiplier 500 and the subtracter 510. The configurations of other components of the sensor output computing part 42' are similar to those of the sensor output computing part 42. The analog or digital signal outputted from the third optical sensor 330 is inputted into the multiplier 520 through a third input end IN3, so that the analog or digital signal outputted from the third optical sensor 330 is multiplied by a correction coefficient C. The signals outputted from the first optical sensor 310 and the second optical sensor 320 will be processed by the subtracter 510 to obtain a computing result. By the adder 530, the computing result is then added to the signal which is outputted from the third optical sensor 330 and corrected by the multiplier 520. As a consequence, the output end OUT of the sensor output computing part 42' will output a signal corresponding wavelength component having compensated backlight and/or dark current (see FIG. 5D).

In an embodiment, the computing operation is performed by the sensor output computing part 42' according to the following equation:

$$Ia(T, BL, Vis, UV) - B \times Ib(T, BL, Vis) + C \times Ic(T, BL) =$$
$$Ia(UV) + Ia(Vis) - B \times Ib(Vis) + Ia(T, BL) -$$
$$B \times Ib(T, BL) + C \times Ic(T, BL) = Ia(UV)$$

In this equation, Ia(T,BL,Vis,UV) indicates the photocurrent that is excited by the external light (visible light+UV light), the backlight and the temperature and generated by the first optical sensor 310; and Ib(T,BL,Vis) indicates the photocurrent that is excited by the visible light, the backlight and the temperature and generated by the second optical sensor 320; and Ic(T,BL) indicates the photocurrent that is excited by the backlight and the temperature and generated by the third optical sensor 330. Moreover, T indicates the temperature, BL indicates the backlight, Vis indicates the visible light intensity, and UV indicates the UV light intensity. Here, the correction coefficient B is the reciprocal of the visible light transmittance of the first polarizer L1 of the display panel 100a. The transmittance (1/B) is equal to a ratio of the visible light intensity detected by the first optical sensor 310 to the visible light intensity detected by the second optical sensor 320 (i.e. Ib(Vis)/Ia(Vis)). In other words, Ia(Vis)−B×Ib(Vis)=0, Moreover, since the backlight and the temperature have the same influence on the first optical sensor 310, the second optical sensor 320 and the third optical sensor 330 (i.e. Ia(T,BL)=Ib(T,BL)=Ic(T,BL)). The correction coefficient C is equal to B−1, so that Ia(T,BL)−B×Ib(T,BL)+C×Ic(T,BL)=0.

Afterwards, the UV light intensity can be deduced as the equation:

$$UV = A \times [Ia(T,BL,Vis,UV) - B \times Ib(T,BL,Vis) + C \times Ic(T,BL)]$$

In the above equation, A is a proportionality coefficient (mW/cm$^2$/A).

From the above description in Example 2, since the backlight emitted from the backlight source BL and the dark current resulted from any external factor irrelevant to the light intensity (e.g. temperature) could be compensated, the detecting accuracy of detecting the UV light intensity is enhanced.

It is noted that, however, those skilled in the art will readily observe that numerous modifications and alterations may be made while retaining the teachings of the invention.

In the above embodiments, the UV detecting module includes one first optical sensor 310, one second optical sensor 320 and one third optical sensor 330. For enhancing the detecting precision or any other purpose, the UV detecting module may include two or more first optical sensors 310, two or more second optical sensors 320 and two or more third optical sensors 330.

In the above embodiments, the present invention is illustrated by referring a LCD panel as the display panel. Nevertheless, the display panel may be an OLED display panel.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display device comprising a display panel for displaying images, comprising:

a first polarizer disposed on a first substrate of the display panel at a side of receiving an external light, which blocks UV-light but transmits visible light;

a second polarizer disposed on a second substrate of the display panel at a side of receiving a backlight, which blocks UV-light but transmits visible light;

a black matrix disposed on the first substrate at a side opposite to the first polarizer, which blocks both UV-light and visible light;

at least one first optical sensor disposed on the first substrate of the display panel and unsheltered by the first polarizer and the black matrix, wherein the external light is detectable by the first optical sensor, and the first optical sensor outputs a first signal in response to a detected wavelength component of the external light;

at least one second optical sensor disposed on the first substrate of the display panel, unsheltered by the black matrix and sheltered by the first polarizer, wherein a visible light passing through the polarizer is detectable by the second optical sensor, and the second optical sensor outputs a second signal in response to a detected wavelength component of the visible light;

at least one third optical sensor disposed on the first substrate of the display panel and sheltered by the first polarizer and the black matrix so that the external light is hindered, wherein the backlight passing through the second polarizer is detectable by the third optical sensor, and the third optical sensor outputs a third signal in response to a detected wavelength component of the backlight; and a sensor output computing part for computing a UV light intensity of the external light according to the first signal and the second signal outputted from the first optical sensor and the second optical sensor, respectively, and compensating the influence of the backlight on the signals outputted by the first optical sensor and the second optical sensor according to the third signal.

2. The display device according to claim 1 wherein a computing signal is obtained by subtracting the product of the second signal outputted and a reciprocal of a visible light transmittance of the first polarizer from the first signal, and the UV light intensity of the external light is computed by the sensor output computing part according to the computing signal.

3. The display device according to claim 1 further comprising a signal converting part, which is arranged in upstream of the sensor output computing part, wherein an analog signal to be inputted into the sensor output computing part is firstly converted into a digital signal by the signal converting part, and the digital signal is then delivered to the sensor output computing part.

4. The display device according to claim 1 wherein further comprising a signal converting part, wherein an analog signal indicating the UV light intensity and outputted from the sensor output computing part is converted into a digital signal by the signal converting part.

5. The display device according to claim 1 wherein the optical sensors are LTPS lateral PIN photodiodes or amorphous silicon diodes.

6. The display device according to claim 1 wherein the display panel is a LCD panel or an OLED display panel.

7. An electronic apparatus equipped with a display device according to claim 1.

* * * * *